No. 793,937. Patented July 4, 1905.

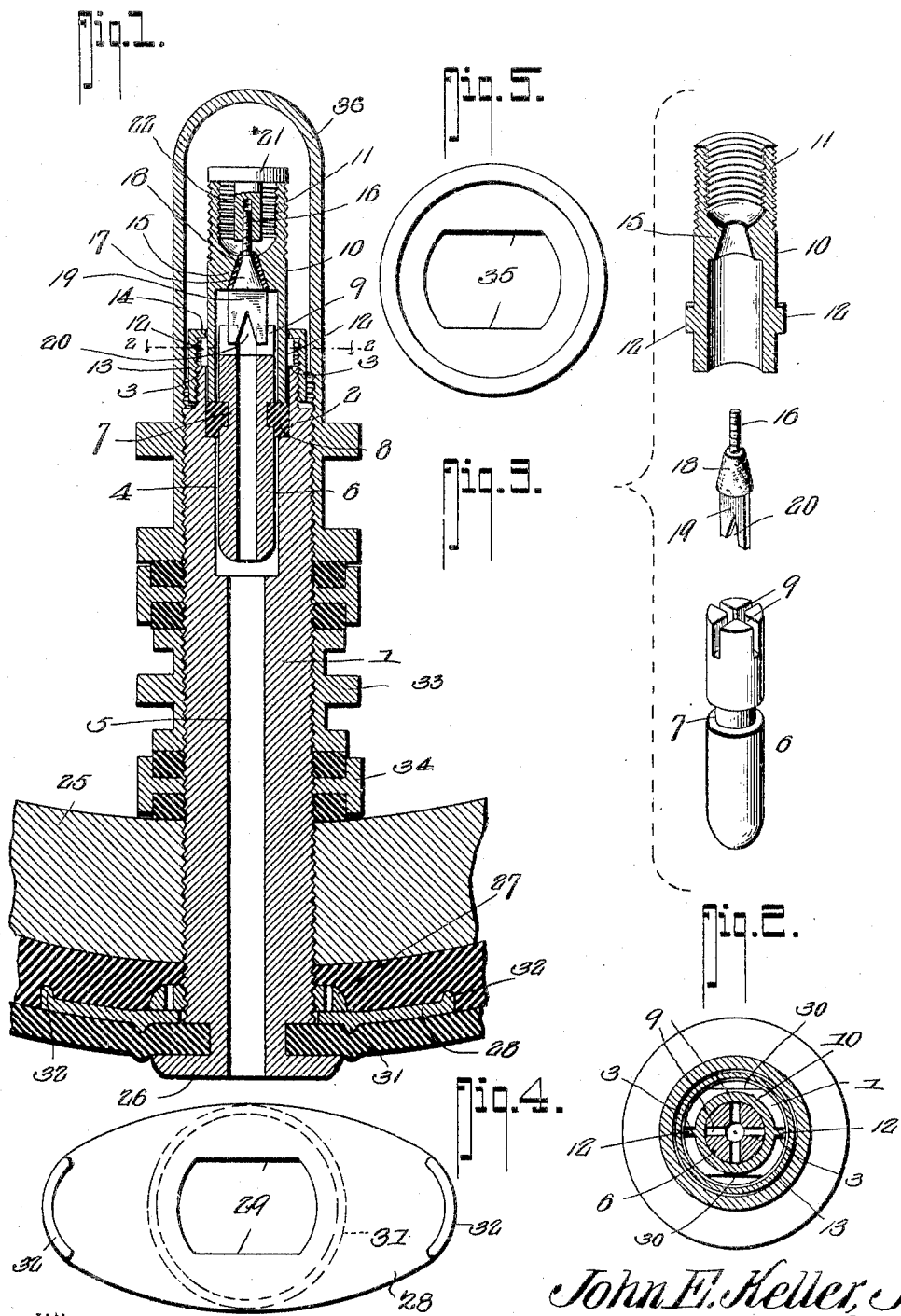

UNITED STATES PATENT OFFICE.

JOHN ESTEN KELLER, JR., OF LITCHFIELD, CONNECTICUT.

INFLATION-VALVE.

SPECIFICATION forming part of Letters Patent No. 793,937, dated July 4, 1905.

Application filed August 20, 1904. Serial No. 221,569.

*To all whom it may concern:*

Be it known that I, JOHN ESTEN KELLER, Jr., a citizen of the United States, residing at Litchfield, in the county of Litchfield and State of Connecticut, have invented a new and useful Inflation-Valve, of which the following is a specification.

This invention relates to inflation-valves, and is particularly designed for use in connection with tires for vehicles.

The object of the invention is to facilitate the removal of the tubular head of the device, so as to give convenient access to the valve mechanism.

It is also designed to provide for mechanically seating the valve after inflation, so as to insure an air-tight closure of said valve, and in this connection it is designed to provide for effectually holding the valve against rotation during the operation of mechanically seating the same.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a longitudinal sectional view of the inflation-valve constructed in accordance with the present invention. Fig. 2 is a cross-sectional view on the line 2 2 of Fig. 1. Fig. 3 is a detail sectional perspective view of the head member removed. Fig. 4 is a detail view of the tire-clamping washer.

Like characters of reference designate corresponding parts in each and every figure of the drawings.

The present valve includes a tubular stem 1, which is of equal external diameter throughout its length and externally screw-threaded for the reception of suitable rim-engaging nuts to clamp the tubular stem upon a rim. The outer end of the stem is counterbored, as at 2, and said outer extremity is provided with diametrically opposite longitudinal notches or recesses 3. At the inner end of the counterbored portion the bore of the stem is slightly constricted, as at 4, and the remainder of the bore of the stem is still further constricted, as at 5, so as to increase the thickness of the walls of the stem throughout the greater length thereof. Within the constricted portion 4 of the stem is an open-ended tube 6, which projects beyond the open outer end of the stem and is provided with an intermediate annular groove 7 for the reception of a packing-ring 8, which fits within the counterbore 2 and engages the bottom thereof. The top of this tube is provided with a series of radial notches 9, which intersect at the axial line of the tube, and the bore of the latter terminates at the bottom of these notches.

Between the outer end of the tube 6 and the counterbore 2 of the stem there is an annular space in which is fitted the lower end of an open-ended tubular head 10, with its outer end provided with an internally and externally threaded nipple 11 for connection with a pump. This head is provided with external projections 12, which fit in the notches or recesses 3 in the outer end of the stem, so as to prevent rotation of the tubular head, there being a retaining-cap 13, internally threaded to fit the threaded stem and provided at its outer end with an inwardly-directed annular flange 14 to engage the outer ends of the projections 12, and thereby firmly hold the head upon the stem. By removing the retaining-cap the head may be quickly slipped from the stem without unscrewing the same, which is a very important feature of the present invention, as it materially facilitates the detachment of the head. About midway between the ends of the head there is an inner annular enlargement 15, the bore of which is tapered upwardly, so as to form a tapered or substantially conical valve-seat.

Within the tubular head 10 is a valve mechanism consisting of a threaded stem 16, which is provided near its lower end with a substantially conical enlargement 17, constituting the valve proper and inclosed within a rubber or other suitable packing 18, which is screwed down over the stem and snugly engaged with the conical valve portion 17. A flat guide blade or wing 19 depends from the lower end of the valve 17 and extends diametrically across the latter, with its lower end working in corresponding notches 9 of the tube 6 as a guide for the valve, the lower extremity of the guide-wing being provided with an inverted substantially V-shaped notch or recess 20. Normally when the tire is inflated the valve is held at its outer limit by the pressure of the air and is thereby seated to prevent escape of the air, it of course being understood that the notches 9 and the guide-wing 19 are so proportioned that said guide-wing remains within a pair of notches when the valve is at its outer limit, with a space between the bottom of the wing and the bottoms of the notches sufficient to permit of a downward movement of the valve to open the valve port or seat during the inflation of the tire. When the guide-wing 19 is within one pair of notches 9, the V-shaped notch or recess 20 is in alinement with the inner ends of the other pair of notches 9, so as to prevent obstructing the latter, and thereby to permit of the incoming air passing inwardly through the unobstructed notches 9 and into the tube 6.

When the valve-seat and the valve becomes worn, the pressure of the air within the tire is not always sufficient to properly seat the valve and prevent leakage, and to overcome this disadvantage I propose to mechanically maintain the valve seated and accomplish this object through the medium of a closure for the outer end of the tubular head 10, which consists of a cap 21, having a milled outer edge and designed to engage with the outer end of the head and provided with an internally-threaded tubular stem 22 to fit the threaded valve-stem 16, whereby when the cap 21 engages the head 10 and the cap is further rotated the valve will be drawn outwardly into snug engagement with the seat 15, thereby to effect a mechanical seating of the valve independently of the air-pressure. When it is desired to inflate the tire, the cap 21 is backed off from the head 10 and then pushed inwardly, so as to positively unseat the valve, and thereby prevent sticking thereof during the operation of inflating the tire. After the cap has been pressed inwardly and the valve unseated it is entirely removed from the stem, and then the pump-coupling is engaged with the nipple 11, either with the interior or the exterior thereof, according to the construction of the coupling.

From the foregoing description it will be understood that the present construction obviates a threaded connection between the tubular head 10 and the stem and in lieu thereof provides a slip-joint to permit of the ready removal of the head for access to the valve whenever it is desired to repair or replace the same, the retaining-cap 13 operating to effectually hold the head in place. By reason of the guide-wing 19 fitting in corresponding notches 9 in the tube 6 the valve and its stem are held against rotation during the application and removal of the cap 21. Moreover, the head 10 is drawn down against the packing-ring 8 by the adjustment of the retaining-cap 13, thereby to insure an air-tight joint between the tube 6 and the stem 1. By employing a guide-tube 6 of considerable length with a packing-washer located substantially midway of its ends a rigid support of the tube within the stem is insured, so as to maintain the notches 9 in longitudinal alinement with the valve-stem, and thus insure a proper working of the valve without liability of the guide-wing 19 being wedged within the notches.

The tubular stem or casing of the present valve extends through the inner and outer tubes of the tire and also through the rim 25 in the usual manner and is provided at its inner end with a head 26 to engage the interior of the inner tube with a nut 27, engaging the threaded portion of the stem so as to clamp the inner tube between the head 26 and the nut. Interposed between the nut and the inner tube is a clamping-washer 28 of elongated or elliptical form with its opening flattened at diametrically opposite points, as indicated at 29, to engage the corresponding flat faces 30 of the stem or casing 1, so as to prevent rotation of the washer when tightening the nut. This washer is substantially flat throughout its center, and at the outer edge of the flat portion is an annular rib 31, forming a cup slightly greater in diameter than the head 26 of the stem, so as to effectually clamp the inner tube between the head and the washer. This washer is disposed longitudinally of the tire, and is therefore longitudinally bowed or deflected from its flattened central portion to its respective ends, and said ends or terminals are provided with edge ribs or flanges 32 upon the outer side of the washer, so as to impinge against the outer tube, and thereby clamp the latter against the rim 25.

The stem or casing 1 may be clamped upon the rim in any suitable manner—as, for instance, by means of a nut 33, embracing the stem, with a washer 34 interposed between the nut and the rim, said washer having its opening provided with flattened portions 35 to engage the flattened portions of the stem, and thereby prevent rotation of the washer upon the stem.

A dust-cap 36 embraces the outer end of the stem and is internally threaded to fit the threaded stem, there being a washer similar to the washer 34 interposed between the dust-cap and the nut 33.

Having thus described the invention, what is claimed is—

1. An inflation-valve comprising a tubular stem provided with a smooth counterbore, a guide-tube fitted within the counterbore and provided with a packing-ring engaging the back of the counterbore, an externally-smooth valve-tube embracing the guide-tube within the counterbore of the stem and engaging the packing-ring, valve mechanism within the valve-tube, and a retaining-cap detachably connecting the valve-tube with the stem.

2. An inflation-valve comprising a tubular stem provided with a smooth counterbore, a guide-tube fitted within the counterbore and provided with a packing-ring engaging the back of the counterbore, an externally-smooth valve-tube embracing the guide-tube within the counterbore of the stem and engaging the packing-ring, valve mechanism within the valve-tube, and means to detachably connect the valve-tube with the stem.

3. An inflation-valve comprising a tubular stem provided with a smooth counterbore and having terminal notches in the counterbored portion, a guide-tube fitted within the counterbore of the stem, a valve-tube embracing the guide-tube and provided with external projections fitting in the notches of the stem, valve mechanism within the valve-tube, and a retaining-cap embracing the valve-tube and detachably connecting the same to the stem.

4. An inflation-valve comprising an externally-threaded stem provided in its outer end with a counterbore and having said counterbored portion terminally notched, a guide-tube fitted within the counterbored portion of the stem, a valve-tube embracing the guide-tube within the counterbore and provided with projections engaging the notches of the stem, valve mechanism within the valve-tube, and a retaining-cap internally threaded for engagement with the threads of the stem and provided with an inner annular flange embracing the valve-tube and engaging the projections thereof to retain the same in the notches of the stem.

5. An inflation-valve comprising a tubular stem having a counterbore, a guide-tube fitted within the counterbore and projected into the stem, a valve-tube embracing the guide-tube within the counterbore, valve mechanism within the valve-tube, and a retaining-cap embracing the valve-tube and detachably engaging the stem to retain the valve-tube upon the stem.

6. An inflation-valve comprising a tubular stem having a counterbore, a guide-tube fitted within the counterbore and projected into the stem, a packing-ring embracing the tube and engaging the back of the counterbore, a valve-tube embracing the guide-tube within the counterbore and bearing against the packing-ring, valve mechanism within the valve-tube, and a retaining-cap embracing the valve-tube and detachably engaging the stem.

7. An inflation-valve comprising a tubular stem having a counterbore, a guide-tube fitted in the counterbored portion of the stem and provided at its outer end with substantially radial notches in communication with the bore of the tube, a valve-tube embracing the guide-tube within the counterbore and provided with an inner valve-seat, a valve coöperating with the seat and provided with a guide-blade working in corresponding notches of the valve-tube, said blade being provided with an opening for registration with the other notches of the guide-tube, and a retaining-cap embracing the valve-tube and detachably engaging the stem.

8. An inflation-valve comprising a tubular stem, a guide-tube fitted therein and provided in its outer end with substantially radial notches communicating with the bore thereof, a valve-tube embracing the notched end of the guide-tube and provided with an internal valve-seat, and a valve coöperating with the seat and provided with a guide-blade working in corresponding notches of the guide-tube and provided with an opening for registration with other notches of the guide-tube.

9. An inflation-valve comprising a tubular stem, a guide-tube fitted within the stem, a valve-tube embracing the guide-tube and projected beyond the stem and also provided with an internal valve-seat, a valve coöperating with the seat and provided at one side with a guide engaging the guide-tube and at its opposite side with a threaded stem, and a valve-retainer including an internally-threaded stem receiving the threaded stem of the valve and having a head to engage the outer end of the valve-tube.

10. An inflation-valve comprising a tubular stem having a counterbore in its outer end with said counterbored portion terminally notched, a guide-tube fitted within the counterbore and projected into the interior of the stem, the outer end of the guide-tube being provided with sets of substantially radial notches intersecting the bore thereof, a packing-ring embracing the tube and engaging the back of the counterbore, a valve-tube embracing the guide-tube within the counterbore and engaging the packing-ring, said valve-tube having an internal valve-seat and external projections fitting in the notches of the stem, a valve coöperating with the valve-seat and provided at its inner side with a guide-wing working in corresponding notches of the guide-tube and provided in its outer end with a notch for registration with some of the other notches, said valve having a threaded stem projected at the opposite side thereof, a valve-retainer having an internally-threaded stem engaging the threaded stem of the valve and provided with a head engaging the outer end of the valve-tube, and a retaining-cap detachably embracing the stem and provided with an inner annular flange engaging the projections of the valve-tube to hold the same within the notches of the tubular stem.

11. An inflation-valve comprising an externally-threaded tubular stem having externally-flattened portions and a head at its inner end, valve mechanism within the tubular stem, an elongated washer having an opening to receive the stem with said opening provided with flattened portions to engage the flattened portions of the stem, the central portion of the washer being flat and the flattened portion having a peripheral rib projected toward the head of the stem, and the ends of the washer being deflected away from the head and provided with terminal transverse ribs opposite the annular rib, a nut embracing the stem at the outer side of the washer, and rim-engaging means carried by the stem.

In testimony that I claim the foregoing as my own I have hereto affixed my signature in the presence of two witnesses.

JOHN ESTEN KELLER, JR.

Witnesses:
JOHN L. MOWER,
STEWART W. SMITH.